United States Patent
Jeanroy

(10) Patent No.: US 9,519,004 B2
(45) Date of Patent: Dec. 13, 2016

(54) SENSOR WITH MOVING SENSITIVE ELEMENT HAVING MIXED VIBRATING AND PENDULAR OPERATION, AND METHODS FOR CONTROLLING SUCH A SENSOR

(71) Applicant: SAGEM DEFENSE SECURITE, Boulogne Billancourt (FR)

(72) Inventor: Alain Jeanroy, Boulogne Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 15/037,518

(22) PCT Filed: Oct. 21, 2014

(86) PCT No.: PCT/EP2014/072580
§ 371 (c)(1),
(2) Date: May 18, 2016

(87) PCT Pub. No.: WO2015/074817
PCT Pub. Date: May 28, 2015

(65) Prior Publication Data
US 2016/0282382 A1   Sep. 29, 2016

(30) Foreign Application Priority Data
Nov. 20, 2013 (FR) .................................... 13 61433

(51) Int. Cl.
*G01P 15/00* (2006.01)
*G01P 15/097* (2006.01)
*G01P 15/08* (2006.01)
G01C 19/5656 (2012.01)
G01C 19/5719 (2012.01)
G01P 15/18 (2013.01)
G01P 15/14 (2013.01)
(Continued)

(52) U.S. Cl.
CPC ......... *G01P 15/097* (2013.01); *G01P 15/0802* (2013.01); *G01C 19/56* (2013.01);
(Continued)

(58) Field of Classification Search
CPC . G01C 19/5719; G01C 19/56; G01C 19/5642; G01C 19/5733; G01C 19/5656; G01P 15/18; G01P 15/125; G01P 15/0802; G01P 15/097; G01P 15/14; G01P 15/0888; G01P 2015/082; G01P 2015/0814; G01P 2015/0848
(Continued)

(56) References Cited

U.S. PATENT DOCUMENTS 6,230,563 B1 * 5/2001 Clark ................. G01C 19/5719
                                                              73/504.04
6,470,748 B1 * 10/2002 Geen .................. G01C 19/5719
                                                              73/504.12
(Continued)

FOREIGN PATENT DOCUMENTS

EP          2339293 A1    6/2011
FR          2983574 A1    6/2013

*Primary Examiner* — Lisa Caputo
*Assistant Examiner* — Jonathan Dunlap
(74) *Attorney, Agent, or Firm* — Muncy, Geissler, Olds & Lowe, P.C.

(57) ABSTRACT

A sensor comprising: a stand; a first body movable along a sensing axis; two pairs of second bodies arranged symmetrically relative to the first body and along the sensing axis; transducers for detecting a position of the first body relative to the stand, for setting the second bodies into vibration along a vibration axis, and for detecting respective vibration frequencies of the second bodies; and surface electrostatic coupling means connecting each second body to the first body in such a manner that a movement of the first body relative to the stand along the sensing axis gives rise respectively to an increase and to a decrease in the electrostatic coupling for one and the other of the pairs of second bodies. Methods of controlling such a sensor.

8 Claims, 1 Drawing Sheet

(51) Int. Cl.
*G01C 19/5733* (2012.01)
*G01C 19/5642* (2012.01)
*G01C 19/56* (2012.01)
*G01P 15/125* (2006.01)

(52) U.S. Cl.
CPC ..... *G01C 19/5642* (2013.01); *G01C 19/5656* (2013.01); *G01C 19/5719* (2013.01); *G01C 19/5733* (2013.01); *G01P 15/0888* (2013.01); *G01P 15/125* (2013.01); *G01P 15/14* (2013.01); *G01P 15/18* (2013.01); *G01P 2015/082* (2013.01); *G01P 2015/0814* (2013.01); *G01P 2015/0848* (2013.01)

(58) Field of Classification Search
USPC ............ 73/504.12, 504.14, 504.04, 862.041, 510,73/514.32, 514.29, 514.38
See application file for complete search history.

(56) References Cited

U.S. PATENT DOCUMENTS

| | | | | |
|---|---|---|---|---|
| 6,742,390 B2* | 6/2004 | Mochida | ............ | G01C 19/5719 73/504.04 |
| 6,918,298 B2* | 7/2005 | Park | ............ | G01C 19/56 73/504.16 |
| 7,004,024 B1* | 2/2006 | Park | ............ | G01C 19/56 73/504.16 |
| 7,093,487 B2* | 8/2006 | Mochida | ............ | G01C 19/5719 73/504.14 |
| 7,191,653 B2* | 3/2007 | Park | ............ | G01P 15/0888 73/504.12 |
| 7,377,167 B2* | 5/2008 | Acar | ............ | G01C 19/5719 73/504.12 |
| 7,421,897 B2* | 9/2008 | Geen | ............ | G01C 19/574 73/504.12 |
| 8,113,050 B2* | 2/2012 | Acar | ............ | G01C 19/574 73/504.04 |
| 8,322,213 B2* | 12/2012 | Trusov | ............ | G01C 19/5747 73/504.12 |
| 8,342,023 B2* | 1/2013 | Geiger | ............ | G01C 19/574 73/504.04 |
| 8,904,865 B2* | 12/2014 | Blomqvist | ............ | G01C 19/5747 73/504.12 |
| 2003/0131664 A1* | 7/2003 | Mochida | ............ | G01C 19/5719 73/504.12 |
| 2010/0313657 A1* | 12/2010 | Trusov | ............ | G01C 19/5747 73/504.16 |
| 2011/0079079 A1 | 4/2011 | Classen et al. | | |
| 2015/0354981 A1* | 12/2015 | Walther | ............ | G01C 19/5726 73/1.77 |

* cited by examiner

SENSOR WITH MOVING SENSITIVE ELEMENT HAVING MIXED VIBRATING AND PENDULAR OPERATION, AND METHODS FOR CONTROLLING SUCH A SENSOR

BACKGROUND OF THE INVENTION

Field of the Invention

The present invention relates to a sensor usable for detecting an acceleration, a pressure, or more generally any physical magnitude for which a variation can cause a movable body to move relative to a stand. The invention is more particularly suitable for use in an application to an inertial acceleration sensor, and in particular a sensor of microelectromechanical system (MEMS) type.

Brief Discussion of the Related Art

An acceleration sensor having a vibrating resonator generally comprises a seismic body (or test mass) connected to a support by a vibrating element that is generally in the form of a beam extending along a sensing axis of the sensor. The sensor has transducers for setting the beam into vibration at the resonant frequency of the beam and for detecting variations in the frequency of vibration of the beam. Under the effect of an acceleration applied to the support, the seismic body exerts an axial force on the beam in compression or in traction: this leads to a change in the stiffness of the beam and thus to a change in its resonant frequency.

The acceleration measurement is thus deduced from a variation in the resonant frequency of the beam that is small, thereby leading to a measurement bias that is relatively large. Under the effects of acceleration, a force is applied to the resonator that changes its resonant frequency: the resulting deformation is relatively small and resembles interfering deformation as generated by variations in temperature or by stresses relaxing in the assemblies.

In order to eliminate this bias and other undesirable common mode effects (non-linearity, temperature sensitivity, ... ), the measurements are performed differentially by replacing the single beam with two beams in a tuning fork configuration, which beams are subjected to stresses of opposite signs that are applied either by a seismic body that is common to both beams or else by two seismic bodies, each connected to a respective one of the beams.

In order to limit this measurement bias, proposals have also been made to implement electrostatic stiffness in parallel with the mechanical stiffness of the beam so that under the effect of an acceleration, the seismic body modifies the electrostatic stiffness.

In a sensor using this principle, the electrostatic stiffness is obtained by means of comb electrodes attached to each of the vibrating beams of a tuning fork in such a manner that under the effect of an acceleration the test body changes the airgap between the comb electrodes and thus changes the electrostatic stiffness generated by said electrodes. The change in the stiffness leads to a change in the frequencies of vibration of the beams. The beams have different frequencies of vibration and the difference between the two frequencies is a measure of the acceleration.

Increasing the amplitude of the variations thus makes it possible to reduce measurement bias.

BRIEF SUMMARY OF THE INVENTION

An object of the invention is to provide means enabling the performance of sensors to be improved even more.

To this end, the invention provides a sensor comprising: a stand; a first body connected to the stand to be movable along a sensing axis by first suspension means defining a suspension plane; two resonators that are arranged symmetrically about the first body along the sensing axis and each of which comprises a pair of second bodies each connected to the stand by second suspension means in order to be movable along a vibration axis that is substantially perpendicular to the sensing axis, and that are connected to each other by third suspension means; transducer members connected to a control unit for detecting a position of the first body relative to the stand, for setting the second bodies into vibration along the vibration axis, and for detecting respective vibration frequencies of the second bodies; and surface electrostatic coupling means connecting each second body to the first body in such a manner that a movement of the first body relative to the stand along the sensing axis leads to an increase in electrostatic coupling for one of the pairs of second bodies and to a decrease in electrostatic coupling for the other pair of second bodies.

Thus, these resonators are of relatively large equivalent mass and Q-factor and of relatively low resonant frequency. When the first body moves under the effect of an external action, it leads to an increase in electrostatic stiffness of one of the resonators and to a decrease in the electrostatic stiffness of the other resonator, thereby increasing the resonant frequency of one of the resonators and decreasing the resonant frequency of the other resonator. Causing the electrostatic stiffness to vary as a result of a movement also makes the sensor less sensitive to temperature or to stresses relaxing in the assembly than it would be if the variation were the result of applying a force. The arrangement of the sensor with a single first body that, by moving, varies the frequencies of vibration of the resonators makes it possible to have a single input while still having a relatively large test mass for each of the two resonators, for given size. This arrangement also makes it possible to have surface electrostatic coupling means, i.e. means whereby the movement of the first body leads to a variation in surface area leading to a variation in electrostatic coupling, which variation is, to the first order, more linear than a variation of an airgap, and therefore easier to use. This leads to an improvement in the performance of the sensor. A measurement of the movement of the first body is also representative of the external action. The sensor of the invention thus incorporates both a pendular mode of operation and a vibration mode of operation, which can be used in particular to achieve measurement redundancy. As a result, the sensor of the invention provides an additional function that is made available by the first body in combination with the transducers making available the open loop pendular mode of operation, which is capable of providing measurements that enable the performance of the sensor to be even further improved.

The invention also provides a first method of controlling such a sensor. This method comprises the step of detecting a movement of the first body in order to determine a first measurement value, and the step of detecting a variation in the frequencies of the resonators in order to determine a second measurement value.

Two values are thus obtained, a first by a pendular mode of operation and a second by a vibration mode of operation. These two modes of operation are not sensitive to the same disturbances, and as a result it can be advantageous to give precedence to one or the other of these modes of operation depending on external conditions.

In a basic method of using these measurable values, the method includes the step of retaining as the final measurement value a mean of the first measurement value and of the second measurement value.

The invention also provides a second method of controlling a sensor. This method comprises the step of causing the first body to perform a predetermined movement, and the step of processing a signal coming from the transducer members of the resonators in order to determine a measurement value.

It is thus possible to calibrate and/or test the sensor.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DISCUSSION OF THE PREFERRED EMBODIMENTS

Figure 1:
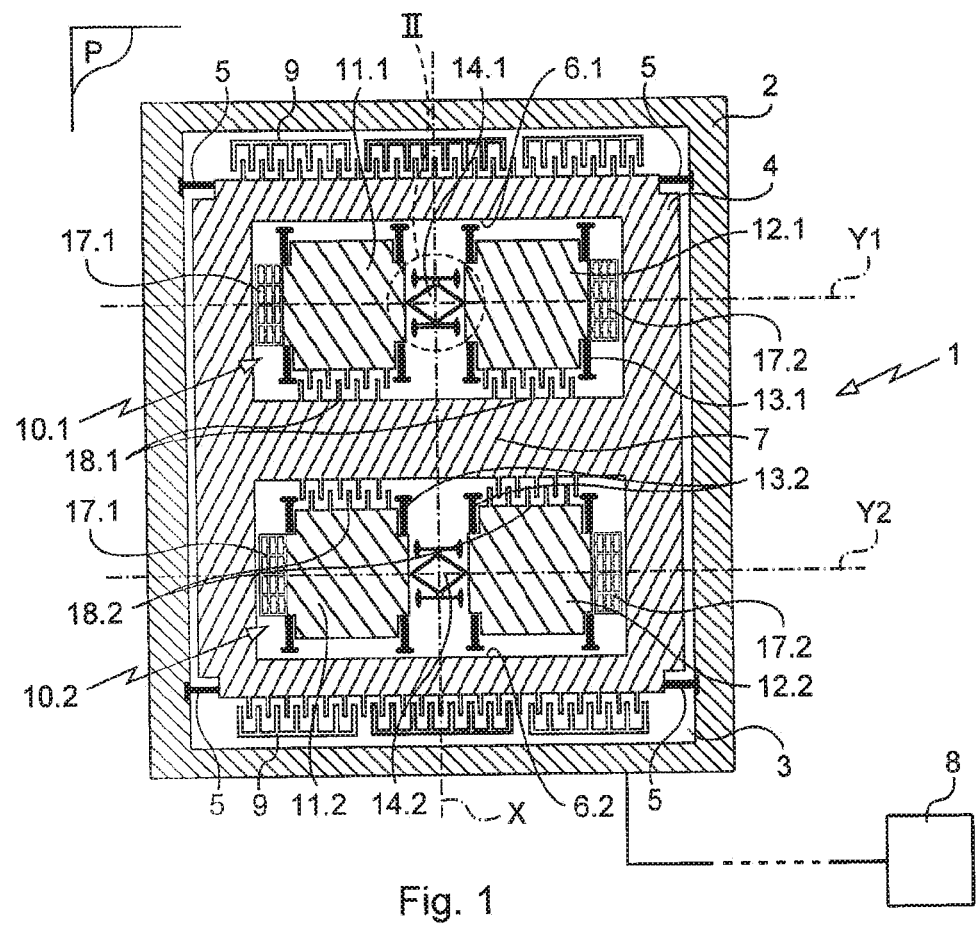
FIG. 1 is a diagrammatic plan view of a sensor of the invention.
Figure 2:
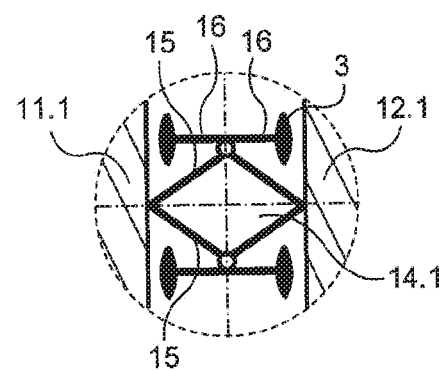
FIG. 2 is an enlarged detail view of a zone II of FIG. 1.

The invention is described herein in its application to measuring acceleration. Naturally, the invention is nevertheless not limited to this application.

The sensor of the invention in this example is of the MEMS type and it is fabricated by etching wafers that comprise at least a semiconductor layer and an electrically conductive layer separated by an electrically insulating layer, known as silicon on insulator (SOI) wafers. This method of fabrication is itself known.

The sensor of the invention comprises a stand given overall reference 1. The stand 1 has a side wall 2 in the form of a rectangular frame arranged on a bottom 3.

A first body 4, which in this example is a so-called seismic "body", is mounted on the stand via first suspension means 5 connecting the body 4 to the side wall of the stand 1. The suspension means 5 define a suspension plane P and they are arranged so that the body is movable along a sensing axis X contained in the suspension plane P.

The body 4 is in the form of a rectangular plate having two cavities 6.1 and 6.2 of rectangular shape formed therein, which cavities are in alignment with each other on the sensing axis X and are spaced apart from each other by a portion 7.

Two resonators given overall references 10.1 and 10.2 are received each in a respective one of the cavities 6.1 and 6.2, and they are thus arranged symmetrically relative to the seismic body 4 along the sensing axis X.

Each resonator 10.1, 10.2 comprises a pair of second bodies 11.1, 12.1, 11.2, 12.2, each connected to the bottom 3 of the stand 1 by second suspension means 13.1, 13.2. The second suspension 13.1, 13.2 are arranged so that each of the bodies 11.1, 12.1, 11.2, 12.2 can vibrate along a vibration axis Y.1, Y.2 that is substantially perpendicular to the sensing axis X. The bodies 11.1, 12.1 are connected together by third suspension means 14.1. The bodies 11.2, 12.2 are connected together by third suspension means 14.2. The bodies and the suspension means are arranged in such a manner that the bodies 4 and the suspension means 5 have a resonant frequency of about 1 kilohertz (kHz) to about 3 kHz, and the resonators 10.1 and 10.2 have a resonant frequency that is high, in this example lying in the range about 10 kHz to about 20 kHz.

The suspension means are formed by blades that are elastically deformable parallel to the suspension plane P, but that present high stiffness along the axis normal to the suspension plane P in order to eliminate degrees of freedom of the bodies to move outside the suspension plane P. The third suspension means 14.1, 14.2 comprise elastically deformable strips 15 arranged in a lozenge shape, having a first diagonal parallel to the vibration axis Y and defined by first vertices connected to the bodies 11.1, 12.1, and a second diagonal that is parallel to the sensing axis and that is defined by second vertices connected to the bottom 3 of the stand 1 by the blades 16 forming links in such a manner that the second vertices are movable solely along the sensing axis X.

The sensor includes transducer members connected to a control unit 8.

First transducer units 9 are connected between the side wall 2 of the stand 1 and the first body 4 and they are arranged in conventional manner to detect a position of the first body 4 relative to the stand 1 and to move the first body 4 relative to the stand 1. The same transducer members may be controlled in order to exert these two functions in alternation, or else one transducer member may be dedicated to the movement function and one transducer member may be dedicated to the detection function.

Second transducer members 17.1, 17.2 are connected between each of the second bodies 11.1, 12.1, 11.2, 12.2 and the bottom 3 of the stand 1, and they are arranged in conventional manner to allow the second bodies 11.1, 12.1, 11.2, 12.2 to vibrate along the vibration axes Y.1, Y.2 and to detect respective vibration frequencies of the second bodies 11.1, 12.1, 11.2, 12.2. The same transducer members may be controlled to exert these two functions in alternation, or else one transducer member may be dedicated to the function of establishing vibration and one transducer member may be dedicated to the function of detection.

The transducer members are made in the form of comb electrodes.

The sensor also has surface electrostatic coupling means connecting each second body 11.1, 12.1, 11.2, 12.2 to the first body 4 in such a manner that a movement of the first body 4 relative to the stand 1 along the sensing axis X leads to an increase in electrostatic coupling for one of the pairs of second bodies 11.1, 12.1, 11.2, 12.2 and to a decrease in electrostatic coupling for the other pair of second bodies 11.1, 12.1, 11.2, 12.2.

The surface electrostatic coupling means 18.1, 18.2 are connected between said portion 7 and the second bodies 11.1, 12.1, 11.2, 12.2 and they are in the form of comb electrodes having their teeth extending parallel to the sensing axis X. Each of the second bodies 11.1, 12.1, 11.2, 12.2 is thus provided with one of the comb electrodes and the portion 7 also has a comb electrode facing each comb electrode of the second bodies 11.1, 12.1, 11.2, 12.2 so that the teeth of the facing electrodes are arranged between one another. The teeth of the two comb electrodes facing each other thus present facing surfaces that are parallel to the sensing axis X and that define the value of the electrostatic coupling provided by said electrodes when they are subjected to an electric voltage. In the event of the portion 7 moving relative to the stand 1, the facing surface areas of the teeth increase or decrease, depending on the resonator under consideration, thereby leading to an increase or a decrease in the electrostatic coupling of the resonator in question, and thus leading to an increase or a decrease in its stiffness, of the resonator in question.

The electrodes of the transducers and the electrodes of the electrostatic coupling means are connected to at least one voltage source by connection means that are controlled by the control unit 8 so as to apply voltage to said electrodes selectively. These connection means and the voltage source are themselves known and are not described in greater detail herein.

It can be understood that under the effect of an acceleration applied to the stand 1, the first body 4 moves, thereby leading to a variation in the electrostatic coupling (and thus to a variation in the electrostatic stiffness of the resonators 10.1, 10.2) that leads to a variation in the resonant frequencies of the resonators 10.1, 10.2.

In known manner, the control unit 8 includes a memory containing a computer program and a processor arranged to execute said program. The program enables sensor control methods to be performed.

Thus, the invention also relates to methods of controlling this sensor when mounted by way of example in a vehicle together with other sensors in order to provide measurements for a navigation unit or a piloting unit of the vehicle.

A first of these methods comprises the following steps:
detecting a movement of the first body 4 by means of the first transducer members 9 in order to determine a first acceleration value; and
detecting a variation in the frequencies of the resonators 10.1, 10.2 by means of the second transducers 17.1, 17.2 in order to determine a second acceleration value.

Thus, the first value is obtained by using the sensor as a pendular accelerometer and the second value is obtained by using the sensor as a vibratory accelerometer.

In a simple version, the method then includes a step of retaining as the value of the acceleration a mean of the first acceleration value and of the second acceleration value. It should be observed that this mean may be calculated by prior weighting of the first and second acceleration values. The weighting coefficients may be set once and for all, e.g. during a calibration step in the factory in order to take account of the relative performance of the pendular mode sensor and of the vibration mode sensor, or they may vary as a function of environmental parameters, such as temperature. A temperature sensor connected to the control unit 8 is then arranged in the vicinity of the sensor, and the control unit 8 includes a memory containing values for the coefficients as a function of temperature.

The invention also relates to a second method of controlling the sensor that enables the sensor to be tested or calibrated.

This method comprises the steps of:
causing the first body 4 to perform a predetermined movement by using the first transducer members 9, which movement is similar to the movement that is caused by an acceleration; and
processing a signal coming from the second transducer members 17.1, 17.2 in order to determine an acceleration value.

Knowing the characteristics of the predetermined movement (it should be observed that the first transducer members 9 can be used to determine the real characteristics of this movement), it is possible to determine the theoretical signal that the second transducer members 17.1, 17.2 ought to supply and thus a theoretical acceleration value. The control unit 8 is programmed to calculate this theoretical acceleration value and compare it with the acceleration value as determined from the signal actually supplied by the second transducer members 17.1, 17.2. This makes it possible to verify the integrity of the sensor and in particular the effectiveness of the transducers and the mobility of the body 4.

The control unit 8 is preferably arranged to act as a function of the difference between the two values in order to determine a correction factor that is to be applied to the acceleration value determined from the signals supplied by the second transducer members 17.1, 17.2. The control unit 8 is also arranged to use the result of the comparison to update an error model of the sensor. In a variant, the result of the comparison is used to adjust the voltages applied to the various electrodes of the sensor in order to minimize the difference that is measured.

The control unit 8 is advantageously programmed to perform this calibration or test method periodically.

The control unit 8 may also be arranged to control the first transducer members 9 so as to filter out disturbances (such as vibration generated by the carrier of the sensor), and for example to implement active suspension that performs controlled damping of the first resonant mode of the first body 4.

Naturally, the invention is not limited to the embodiments described but covers any variant coming within the ambit of the invention as defined by the claims.

In particular, the first body may be of a shape other than that described, and for example it may be in the shape of a plate that has a single cavity formed therein in order to receive both resonators.

The sensor of the invention can be used for detecting any magnitude that can be converted into a movement of the first body relative to the stand, such as an acceleration, a pressure, etc.

The invention claimed is:

1. A sensor comprising: a stand; a first body connected to the stand to be movable along a sensing axis by first suspension means defining a suspension plane; two resonators that are arranged symmetrically about the first body along the sensing axis and each of which comprises a pair of second bodies each connected to the stand by second suspension means in order to be capable of vibrating along a vibration axis that is substantially perpendicular to the sensing axis, and that are connected to each other by third suspension means; transducer members connected to a control unit for detecting a position of the first body relative to the stand, for setting the second bodies into vibration along the vibration axis, and for detecting respective vibration frequencies of the second bodies; and surface electrostatic coupling means connecting each second body to the first body in such a manner that a movement of the first body relative to the stand along the sensing axis leads to an increase in electrostatic coupling for one of the pairs of second bodies and to a decrease in electrostatic coupling for the other pair of second bodies.

2. The sensor according to claim 1, wherein the resonators are arranged on either side of a portion of the first body, the surface electrostatic coupling means being mounted between said portion and the second bodies.

3. The sensor according to claim 2, wherein the first body has two cavities that are in alignment with each other on the sensing axis and each of which receives one of the pairs of second bodies.

4. The sensor according to claim 1, wherein the third suspension means comprise at least one elastically deformable strip given a lozenge shape having a first diagonal that is parallel to the vibration axis and that is defined by first vertices connected to the bodies and a second diagonal that is parallel to the sensing axis and that is defined by second vertices connected to the stand by links in such a manner that the second vertices are movable solely along the sensing axis.

5. The sensor according to claim 1, wherein the transducer members are also arranged to move the first body.

6. The method of controlling a sensor according to claim 5, comprising the step of causing the first body to perform a predetermined movement, and the step of processing a signal coming from the transducer members of the resonators in order to determine a measurement value.

7. A method of controlling a sensor according to claim 1, the method including the step of detecting a movement of the first body in order to determine a first measurement value, and the step of detecting a variation in the frequencies of the resonators in order to determine a second measurement value.

8. The method according to claim 7, comprising the step of retaining as the final measurement value a mean of the first measurement value and of the second measurement value.

\* \* \* \* \*